United States Patent
Martin et al.

(10) Patent No.: US 9,887,435 B2
(45) Date of Patent: Feb. 6, 2018

(54) ELECTROCHEMICAL CELL FOR A LITHIUM-ION BATTERY INCLUDING A NEGATIVE ELECTRODE MADE OF SILICON AND A SPECIFIC ELECTROLYTE

(71) Applicant: COMMISSARIAT A L'ENERGIE ATOMIQUE ET AUX ENERGIES ALTERNATIVES, Paris (FR)

(72) Inventors: Jean-Frederic Martin, Grenoble (FR); Laura Boutafa, Echirolles (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 218 days.

(21) Appl. No.: 14/767,435

(22) PCT Filed: Feb. 18, 2014

(86) PCT No.: PCT/EP2014/053158
§ 371 (c)(1),
(2) Date: Aug. 12, 2015

(87) PCT Pub. No.: WO2014/128130
PCT Pub. Date: Aug. 28, 2014

(65) Prior Publication Data
US 2015/0364793 A1    Dec. 17, 2015

(30) Foreign Application Priority Data
Feb. 19, 2013 (FR) .................. 13 51412

(51) Int. Cl.
*H01M 4/38* (2006.01)
*H01M 4/485* (2010.01)
(Continued)

(52) U.S. Cl.
CPC ....... *H01M 10/0567* (2013.01); *H01M 4/386* (2013.01); *H01M 4/485* (2013.01);
(Continued)

(58) Field of Classification Search
CPC ...... H01M 4/485; H01M 4/505; H01M 4/525; H01M 10/0525; H01M 10/0567;
(Continued)

(56) References Cited

U.S. PATENT DOCUMENTS

2009/0214938 A1    8/2009  Yamamoto et al.
2010/0119956 A1*   5/2010  Tokuda .................. H01M 4/134
                                                           429/338

(Continued)

FOREIGN PATENT DOCUMENTS

EP    2355213 A2    8/2011
EP    2634854 A1    9/2013
(Continued)

OTHER PUBLICATIONS

Michael S. Ding, "Liquid-Solid Phase Diagrams of Ternary and Quaternary Organic Carbonates," Journal of the Electrochemical Society, vol. 151, No. 5, XP055075197, Jan. 1, 2004, pp. A731-A738.

(Continued)

*Primary Examiner* — Brittany Raymond
(74) *Attorney, Agent, or Firm* — Oblon, McClelland, Maier & Neustadt, L.L.P.

(57) ABSTRACT

The invention relates to an electrochemical cell for a lithium-ion battery comprising:
a negative electrode comprising as an active material silicon;
a positive electrode; and
an electrolyte positioned between said negative electrode and said positive electrode, said electrolyte comprising at least one lithium salt, at least one carbonate solvent, at least one mononitrile compound and at least one compound fitting at least one of the following formulae (I) and (II):

(Continued)

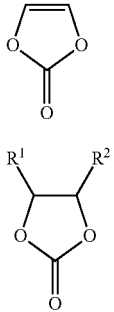

Figure 1:
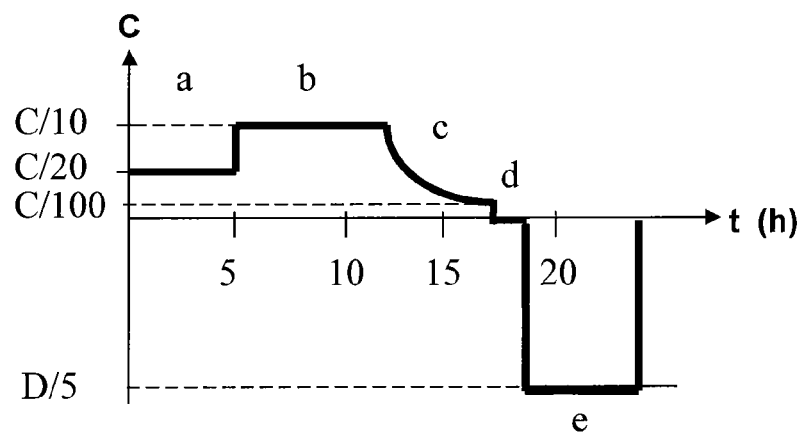

wherein $R^1$ and $R^2$ represent, independently of each other, H, Cl or F, provided that $R^1$ and $R^2$ do not both represent H.

18 Claims, 1 Drawing Sheet

(51) Int. Cl.
*H01M 4/505* (2010.01)
*H01M 4/525* (2010.01)
*H01M 10/0525* (2010.01)
*H01M 10/0567* (2010.01)
*H01M 10/0568* (2010.01)
*H01M 10/0569* (2010.01)
*H01M 10/42* (2006.01)

(52) U.S. Cl.
CPC ........... *H01M 4/505* (2013.01); *H01M 4/525* (2013.01); *H01M 10/0525* (2013.01); *H01M 10/0568* (2013.01); *H01M 10/0569* (2013.01); *H01M 10/4235* (2013.01); *H01M 2300/0025* (2013.01); *H01M 2300/0028* (2013.01); *H01M 2300/0037* (2013.01)

(58) Field of Classification Search
CPC ......... H01M 10/0568; H01M 10/0569; H01M 10/4235; H01M 2300/0025; H01M 2300/0028; H01M 2300/0037
See application file for complete search history.

(56) References Cited

U.S. PATENT DOCUMENTS

| | | | |
|---|---|---|---|
| 2010/0233549 A1* | 9/2010 | Kim | H01M 6/168 429/330 |
| 2011/0250509 A1 | 10/2011 | Yamaguchi et al. | |
| 2012/0202123 A1 | 8/2012 | Jeon et al. | |
| 2012/0313570 A1 | 12/2012 | Ohtaniuchi et al. | |
| 2012/0316716 A1* | 12/2012 | Odani | H01M 10/0567 701/22 |
| 2013/0224535 A1 | 8/2013 | Matsuoka et al. | |
| 2015/0125762 A1 | 5/2015 | Gayot et al. | |

FOREIGN PATENT DOCUMENTS

| | | |
|---|---|---|
| JP | 2005-267857 A | 9/2005 |
| JP | 2010-238385 A | 10/2010 |
| WO | 2012/057311 A1 | 5/2012 |

OTHER PUBLICATIONS

Michael S. Ding, "Liquid-Solid Phase Diagrams of Binary Carbonates for Lithium Batteries," Journal of the Electrochemical Society, vol. 147, No. 5, XP055075256, Jan. 1, 2000, pp. 1688-1694.
International Search Report dated Mar. 13, 2014 in PCT/EP2014/053158 filed Feb. 18, 2014.
Preliminary French Search Report dated Oct. 3, 2013 in FR1351412 filed Feb. 19, 2013.

* cited by examiner

ELECTROCHEMICAL CELL FOR A LITHIUM-ION BATTERY INCLUDING A NEGATIVE ELECTRODE MADE OF SILICON AND A SPECIFIC ELECTROLYTE

TECHNICAL FIELD

The present invention relates to an original lithium-ion battery cell comprising a negative electrode based on silicon, notably based on the use of a complex electrolyte notably giving the possibility of obtaining excellent performances in terms of reversibility at low temperature.

The general field of the invention may thus be defined as being that of lithium-ion type batteries.

Batteries of the lithium-ion type are increasingly used as a self-contained energy source, in particular in portable pieces of electronic equipment (such as mobile phones, portable computers, tooling), where they gradually replace nickel-cadmium (NiCd) and nickel-metal hydride (NiMH) batteries. They are also highly used for providing the power supply required for new micro-applications, such as chip cards, sensors or other electromechanical systems.

The batteries of the lithium-ion type operate on the lithium insertion-deinsertion (or lithiation-delithiation) principle according to the following principle.

During the discharge of the battery, the lithium deinserted from the negative electrode in ionic form $Li^+$ migrates through the ionic conductive electrolyte and will be intercalated in the crystalline lattice of the active material of the positive electrode. The passing of each $Li^+$ ion into the internal circuit of the battery is exactly compensated by the passing of an electron into the external circuit, thereby generating an electric current. The energy density by mass released by these reactions is both proportional to the potential difference between both electrodes and to the amount of lithium which will be intercalated into the active material of the positive electrode.

During the charging of the battery, the reactions occurring within the battery are the reverse reactions of the discharge, i.e.:

the negative electrode will insert lithium into the lattice of the material making it up; and the positive electrode will release lithium.

Because of this operating principle, batteries of the lithium-ion type require two different insertion compounds at the negative electrode and at the positive electrode.

The positive electrode is generally based on a lithiated oxide of a transition metal:

of the lamellar oxide type of formula $LiMO_2$, wherein M may refer to Co, Ni, Mn, Al or mixtures thereof, such as $LiCoO_2$, $LiNiO_2$, $Li(Ni,Co,Mn,Al)O_2$;

of the oxide type with a spinel structure, such as $LiMn_2O_4$; or of the iron phosphate type, such as $LiM^1PO_4$ with $M^1$ being selected from among Fe, Mn, Co and mixtures thereof.

The negative electrode may be based on a carbonaceous material, and in particular based on graphite.

Graphite has a theoretical specific capacity of the order of 370 mAh/g (corresponding to the formation of the alloy $LiC_6$) and a practical specific capacity of the order of 320 mAh/g.

However, graphite has strong irreversibility during the first charging process, a continuous loss of cycling capacity and may have limited performances, notably at low temperatures, with liquid electrolytes, since the diffusion of liquid electrolytes within the graphite forms a limiting factor. In addition to these drawbacks, are added defects inherent to the use of liquid electrolytes, for low temperature applications, such as poor ion transport in the electrolyte and interfacial resistance phenomena.

These different phenomena lead to significant biasing which may lead to a premature cut-off of the battery during charging/discharging with the possibility of attaining very low, or even negative potentials, on the negative electrode during the charging process.

With view to improving the low temperature performances of lithium-ion batteries including a negative electrode based on graphite, the researchers focused their research on the design of novel electrolytes, by acting on the nature of the constituents of said electrolytes, so as to modify its properties, such as for example:

viscosity properties by using specific mixtures of carbonate solvents, which aim at reducing the viscosity of the electrolytes;

charge transfer properties by using specific lithium salts such as $LiBF_4$, as described in Zhang et al., Electrochemistry communications 4, No. 11, 2002;

transport properties through the passivation layer present at the surface of the electrodes, for example by using additives giving the possibility of improving this transport, such as pyrocarbonates (as described in Smart et al., Jet Propulsion Lab. Paper (2000)).

In order to circumvent the drawbacks related to graphite, another solution may consist of replacing the latter with other electrode materials and notably with silicon.

It was in this way that it was demonstrated that insertion of silicon in a negative electrode gave the possibility of significantly increasing the practical specific capacity of the negative electrode related to the insertion of lithium in the latter, which is 320 mAh/g for a graphite electrode and of the order of 3,580 mAh/g for an electrode based on silicon (corresponding to the formation of the alloy $Li_{15}Si_4$ during room temperature insertion of the lithium into the silicon). Thus, by means of simple predictions, it is possible to envision a gain of about 40 and 35%, respectively in volume energy and in mass energy, if graphite is substituted with silicon in a conventional accumulator of the <<lithium-ion>> system. Moreover, the operating potential window of the lithium-silicon alloy of formula $Li_{15}Si_4$ (0.4-0.05 V/Li—$Li^+$) much higher than that of graphite, gives the possibility of avoiding the formation of a lithium metal deposit and the associated risks, while leaving the possibility of proceeding with faster charging processes. Further, it is established that the reaction for forming the lithium-silicon alloy, leading to a very high practical specific capacity (of the order of 3,578 mAh/g), is reversible.

By choosing to develop a lithium-ion battery cell with a negative electrode comprising silicon, the authors of the present invention set the goal of proposing a liquid electrolyte compatible for this type of cell, which has good properties at low temperatures (for example, a temperature ranging from 0 to −40° C., for example −20° C.) and notably good cyclability.

DISCUSSION OF THE INVENTION

Thus, the invention relates to an electrochemical cell for a lithium-ion battery comprising:

a negative electrode comprising, as an active material, silicon;

a positive electrode; and an electrolyte positioned between said negative electrode and said positive electrode, said electrolyte comprising at least one lithium salt, at least one carbonate solvent, at least one mononitrile compound and at least one compound fitting one of the following formulae (I) and (II):

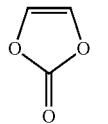

(I)

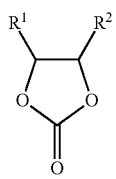

(II)

wherein $R^1$ and $R^2$ represent, independently of each other, H, Cl or F, provided that $R^1$ and $R^2$ do not both represent H.

The compound (II) may be used equally under its various isomeric forms.

The motivated selection of the ingredients of the aforementioned electrolyte resulting in a mixture of carbonate solvent(s), of mononitrile compound(s), of compound(s) of formula (I) and/or (II) and of at least one lithium salt, contributes to improving the low temperature properties of a lithium-ion battery cell, the negative electrode of which includes as an active material, silicon.

Before entering the discussion of this invention in more detail, we specify the following definitions.

By negative electrode, is conventionally meant in the foregoing and in the following, the electrode which acts as an anode, when the generator outputs current (i.e. when it is in a discharging process) and which acts as a cathode, when the generator is in a charging process.

By positive electrode, is conventionally meant, in the foregoing and in the following, the electrode which acts as a cathode, when the generator outputs current (i.e. when it is in a discharging process) and which acts as an anode when the generator is in a charging process.

By mononitrile compound is meant an organic compound including a single nitrile group of formula —CN.

The positive electrode may be an electrode comprising, as an active material, a material for inserting lithium of the lithiated oxide type or of the lithiated phosphate type comprising at least one transition metal element.

As examples of lithiated oxide compounds comprising at least one transition metal element, mention may be made of simple oxides or mixed oxides (i.e. oxides comprising several distinct transition metal elements) comprising at least one transition metal element, such as oxides comprising nickel, cobalt, manganese and/or aluminium (these oxides may be mixed oxides).

More specifically, as mixed oxides comprising nickel, cobalt, manganese and/or aluminium, mention may be made of the following compounds of formula (III):

$$LiM^2O_2 \quad (III)$$

wherein $M^2$ is an element selected from among Ni, Co, Mn, Al and mixtures thereof.

As examples of such oxides, mention may be made of lithiated oxides $LiCoO_2$, $LiNiO_2$ and mixed oxides $Li(Ni,Co,Mn)O_2$ (such as $Li(Ni_{1/3}Mn_{1/3}Co_{1/3})O_2$) also known under the name of NMC, $Li(Ni,Co,Al)O_2$ (such as $Li(Ni_{0.8}Co_{0.15}Al_{0.05})O_2$) also known under the name of NCA, or $Li(Ni,Co,Mn,Al)O_2$.

As examples of lithiated phosphate compounds comprising at least one transition metal element, mention may be made of the compounds of formula $LiM^1PO_4$, wherein $M^1$ is selected from Fe, Mn, Co and mixtures thereof, such as $LiFePO_4$.

In addition to the presence of an active material, such as those defined above, the positive electrode may comprise a polymeric binder, such as polyvinylidene fluoride (PVDF), a carboxymethylcellulose mixture with a latex of the styrene and/or butadiene type as well as one or several electrically conducting adjuvants, which may be carbonaceous materials such as carbon black.

Thus, from a structural point of view, the positive electrode may appear as a composite material comprising a matrix of polymeric binder(s), within which are dispersed fillers formed by the active material and optionally the electrically conducting adjuvant(s).

The negative electrode, as mentioned above, is an electrode comprising, as an active material, silicon (i.e. silicon in an elementary form, or in other words, silicon in the oxidation state 0, i.e. not yet combined with other elements).

Further, as well as for the positive electrode, it may comprise a polymeric binder, such as polyvinylidene fluoride (PVDF), a carboxymethylcellulose mixture with a latex of the styrene and/or butadiene type as well as one or several electrically conducting adjuvants, which may be carbonaceous materials, like carbon black. Furthermore, as well as for the positive electrode, the negative electrode may appear from a structural point of view, like a composite material comprising a matrix of polymeric binder(s) within which are dispersed fillers formed by silicon (for example, appearing in particulate form) and optionally the electrically conducting adjuvant(s).

The aforementioned electrolyte is a non-aqueous liquid electrolyte conducting lithium ions, positioned between the negative electrode and the positive electrode. This electrolyte may be caused to impregnate a porous separator, which is positioned between the positive electrode and the negative electrode of the electrochemical cell.

This separator may be in a porous material, such as a polymeric material, able to collect the liquid electrolyte in its porosity.

The electrolyte of the invention is based on the coexistence, within a liquid medium, of at least four ingredients: at least one carbonate solvent, at least one lithium salt, at least one mononitrile compound and at least one compound of formula (I) or (II). It is understood that said at least one compound of formula (I) or (II) is of a different nature from that of the aforementioned carbonate solvent(s) and vice versa, i.e. the aforementioned carbonate solvent(s) is(are) different from the compounds of formula (I) or (II).

The carbonate solvent may be selected from cyclic carbonates, linear carbonates and mixtures thereof.

As examples of cyclic carbonates, mention may be made of ethylene carbonate (symbolized by the acronym EC), propylene carbonate (symbolized by the acronym PC), preference being given to propylene carbonate which has a melting temperature close to −50° C. and has the capability of forming eutectic mixtures with linear carbonates, which mixtures may have a melting temperature of less than −70° C. Propylene carbonate in an optional mixture with one or several linear carbonates, thus allows low temperature application of the electrochemical cells of the invention.

As examples of linear carbonates, mention may be made of diethyl carbonate (symbolized by the acronym DEC), dimethyl carbonate (symbolized by the acronym DMC), ethyl methyl carbonate (symbolized by the acronym EMC) and mixtures thereof.

More specifically, the electrolyte of the invention may comprise a mixture of carbonate solvents, and more specifically a eutectic mixture of carbonate solvents and even more specifically a binary eutectic mixture. As examples of a mixture of carbonate solvents, mention may be made of a mixture comprising propylene carbonate and at least one linear carbonate selected from diethyl carbonate, ethyl methyl carbonate. More specifically, a particularly suitable mixture of carbonate solvents is a binary eutectic mixture comprising propylene carbonate and ethyl methyl carbonate, the propylene carbonate and ethyl methyl carbonate being present in the mixture in respective contents of 60% by volume and 40% by volume (this mixture may be symbolized by the acronym 0.6PC-0.4EMC) based on the total volume of the mixture of carbonate solvents.

The carbonate solvent, alone or as a mixture, is advantageously present in the electrolyte, in a content ranging from 25 to 75% of the total volume of the electrolyte, for example a content of 25% of the total volume of the electrolyte. Preferably, the total volume of the electrolyte is considered before adding at least one compound of formula (I) or (II) as defined above.

The lithium salt may be selected from the group formed by $LiPF_6$, $LiClO_4$, $LiBF_4$, $LiAsF_6$, $LiCF_3SO_3$, $LiN(CF_3SO_2)_3$, $LiN(C_2F_5SO_2)$, lithium bistrifluoromethylsulfonylimide (known under the acronym of LiTFSI) $LiN[SO_2CF_3]_2$ and mixtures thereof, preference being for the salt $LiPF_6$.

The lithium salt may be present in the electrolyte, according to a concentration ranging from 0.3 M to 2 M, for example, 1 M.

As regards the mononitrile compound, it may advantageously be a mononitrile compound including, outside the group —CN, at least two carbon atoms, compounds of this type may be propionitrile (including 2 carbon atoms outside the —CN group), butyronitrile (including 3 carbon atoms outside the —CN group) or valeronitrile (including 4 atoms outside the —CN group), preference being for butyronitrile, which has ideal properties in terms of melting temperature (−112° C.), of viscosity (0.55 cP, which is a low value) and of dielectric constant (25) which thus allows easy dissociation of lithium salts.

The mononitrile compound, such as butyronitrile, may be present, in the composition, in a content which may range up to 75% by volume based on the total volume of the electrolyte, preferably, a content ranging from 50 to 75% by volume based on the total volume of the electrolyte. Preferably, the total volume of the electrolyte is considered before adding at least one compound of formula (I) or (II) as defined above. Such a large content is made possible by the presence in the electrolyte of compounds of formula (I) or (II), the presence of which in combination with the other ingredients give excellent results in terms of cyclability and durability for an electrolyte which may have a very low viscosity because of the mononitrile compound proportion which may be very high.

Finally, the compound of formula (I) or (II) is advantageously present in the electrolyte in a content ranging from 0.5 to 10% by mass based on the total mass of the other ingredients forming the electrolyte. More specifically, it may be present according to a content ranging from 1 to 5% by mass, still preferably from 2% by mass based on the total mass of the other ingredients forming the electrolyte.

As regards the compound of formula (II), a specific compound entering this definition and particularly suitable is the compound of the following formula (IIa):

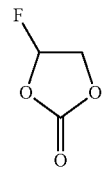

(IIa)

this compound being also called fluoroethylene carbonate.

Specific electrolytes which may enter the structure of the electrochemical cells of the invention may be electrolytes comprising:
  as carbonate solvents, a mixture comprising propylene carbonate and ethyl methyl carbonate, the propylene carbonate and ethyl methyl carbonate being present in the mixture in respective contents of 60% by volume and 40% by volume based on the total volume of the mixture of carbonate solvents (this mixture may be symbolized by the acronym 0.6PC-0.4EMC);
  as a mononitrile compound, butyronitrile;
  as a lithium salt, $LiPF_6$; and
  the compound of formula (I) or the compound of formula (IIa) as defined above,
the carbonate solvents and butyronitrile may be present in the respective contents of 25% and 75% of the total volume of the mixture formed by the carbonate solvents and butyronitrile or vice versa (i.e. respective contents of 75% and of 25%) and the compound of formula (I) or of formula (IIa) being present in a content of 2% by mass based on the total mass of the other ingredients forming the electrolyte.

Other features and advantages of the invention will become apparent from the additional description which follows and which relates to particular embodiments.

Of course, this description addition is only given as an illustration of the invention and is by no means a limitation.

SHORT DESCRIPTION OF THE DRAWINGS

Figure 2:
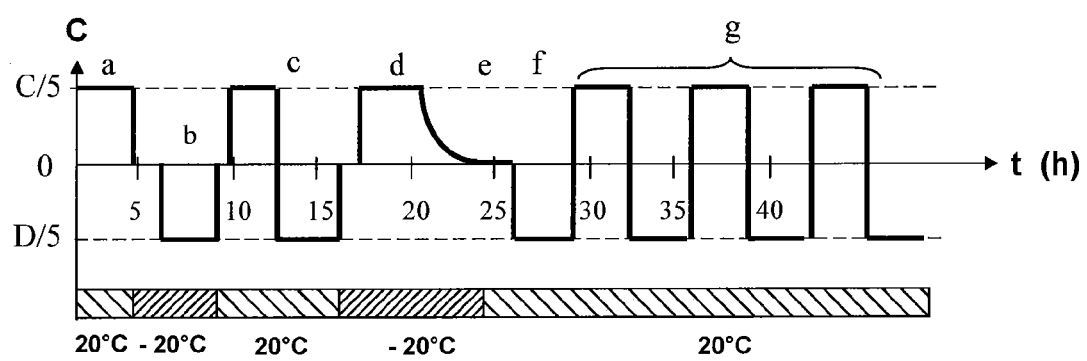

FIGS. 1 and 2 correspond to graphs illustrating the tests applied for the examples discussed below.

DETAILED DISCUSSION OF PARTICULAR EMBODIMENTS

The present examples illustrate electrochemical cells according to the invention and comparative cells, appearing as a button cell comprising:
  as a negative electrode, a negative electrode comprising silicon; and
  as a positive electrode, an electrode comprising a mixed oxide of nickel, manganese and cobalt $LiNi_{0.33}Mn_{0.33}Co_{0.33}O_2$; and
  an electrolyte positioned between said positive electrode and negative electrode, the composition of which will be explained below.

The negative electrode is obtained by depositing on a copper sheet an ink consisting of 82% by mass of silicon, 12% by mass of an electron conductor (carbon black and carbon fibers) and of 6% by mass of a cellulose binder. This electrode (4 mAh/cm$^2$) is calendered and then cut out in the shape of a disc with a diameter of 16 mm.

The positive electrode is obtained by depositing on an aluminium sheet, an ink consisting of 92% by mass of $LiNi_{0.33}Mn_{0.33}Co_{0.33}O_2$, 4% by mass of an electron conductor (carbon black and carbon fibers) and 4% by mass of a polymeric binder PVDF. This electrode (4 mAh/cm$^2$) is calendered and then cut out in the shape of a disc with a diameter of 14 mm.

The button cells are manufactured from these electrodes by stacking a negative electrode disc, a separator impregnated with electrolyte and a positive electrode disc.

The aforementioned button cells have been the subjects of studies for testing the charging and discharging responses of the latter at −20° C., the elaborated tests being:
- a formation test at room temperature giving the possibility of adequately forming the different electrode/electrolyte interphases, this step occurring under slow conditions in order to promote homogeneity of the interphases;
- a test of cyclings at a variable temperature.

The protocol of the formation test at room temperature (20° C.) is as illustrated in FIG. 1 (representing the time-dependent change of the capacity C versus time t (expressed in hours)) and includes the following steps:
- a charging step with constant current C/20 for 5 hours (portion a of the curve in FIG. 1);
- a charging step with constant current C/10 up to 4.2 V (portion b of the curve in FIG. 1);
- a step for sustained charging at constant voltage (4.2 V) up to C/100 (portion c of the curve in FIG. 1);
- a rest step with zero current for 5 minutes (portion d of the curve of FIG. 1);
- a discharging step with constant current D/5 down to 2.5 V (portion e of the curve of FIG. 1).

From this test, the irreversible formation capacity is determined, which corresponds to the proportion of capacity difference between the formation discharging and charging process. This value is related to the initial degradation of the electrolyte on the electrodes, which generally allows formation of the interphases. A low value is sought in order to minimize the loss of capacity related to this formation.

The protocol of the test of cyclings at a variable temperature is such as illustrated in FIG. 2 (representing the time-dependent change in the capacity C versus time t (expressed in hours)) and includes the following steps:
- a charging step to C/5 up to 4.2 V at a temperature of 20° C. (portion a of the curve of FIG. 2);
- a discharging step to D/5 down to 2.5 V after setting temperature to −20° C. for 1 hour (portion b of the curve of FIG. 2);
- a cycling step to C/5 after setting the temperature to 20° C. for 1 hour (portion c of the curve of FIG. 2);
- a charging step to C/5 up to 4.2 V for 10 hours (portion d of the curve of FIG. 2) followed by a sustaining charging step to 4.2 V at −20° C. (portion e of the curve of FIG. 2) followed by a discharging step to D/5 down to 2.5 V after setting a temperature to 20° C. for 1 hour (portion f of the curve of FIG. 2);
- successive cycling steps to C/5 at 20° C. (portion g of the curve of FIG. 2).

From this test, the following quantities were determined:
the instantaneous resistances at 20° C. and at −20° C. as well as the resistances measured at 5 seconds (respectively mentioned in the tables below, $R_{pulse\ 20°\ C.}$, $R_{pulse\ -20°\ C.}$ and $R_{5s\ -20°\ C.}$) during steps a) and b) of FIG. 2;

the capacity proportion discharged at −20° C. (step b)) after charging at 20° C. (mentioned in the tables below by Discharging −20° C.);

the charged capacity at −20° C. under C/5 conditions (mentioned in the tables below by Charging −20° C. C/5) (step d));

the charged capacity at −20° C. under C/5 conditions and then by completing up to 10 hours of charging at a constant potential (steps d) and e)) (mentioned in the tables below by Charging −20° C. C/5+CV);

the capacity obtained at the end of the 5$^{th}$ cycle (cycling of step g)) (i.e. at the end of the 5$^{th}$ discharging process) relatively to the formation discharging process (mentioned in the tables below by reversibility test).

Comparative Example 1

In this comparative example, an electrolyte non-compliant with the invention is used with the aforementioned button cell, corresponding to a quaternary mixture comprising a mixture of 4 carbonate solvents EC/DMC/DEC/EMC (1/1/1/3 by volume), EC meaning ethylene carbonate, DMC meaning dimethyl carbonate, DEC meaning diethylene carbonate, EMC meaning ethyl methyl carbonate and comprising, in addition to these carbonate solvents, 1% by mass of vinylene carbonate of the formula (I) defined above and comprising as a lithium salt, $LiPF_6$ 1 M.

The results obtained with this electrolyte are illustrated by the following table.

|  | Results |
|---|---|
| Irreversible capability of formation | 15% |
| $R_{pulse\ 20°\ C.}$ | 10 Ω |
| $R_{pulse\ -20°\ C.}$ | 42 Ω |
| $R_{5\ s\ 20°\ C.}$ | 108 Ω |
| Discharging −20° C. | 76% |
| Charging −20° C. C/5 | 68% |
| Charging −20° C. C/5 + CV | 97% |
| Reversibility of the charging at −20° C. | 93% |
| Reversibility test | 86% |

Example 1

In this example, an electrolyte according to the invention is used with the aforementioned button cell, corresponding to a ternary mixture comprising two carbonate solvents PC and EMC in respective proportions of 60% by volume and 40% by volume based on the total volume of said two solvents, PC meaning propylene carbonate, EMC meaning ethyl methyl carbonate and comprising, in addition to these carbonate solvents, butyronitrile corresponding to 25% by volume of said mixture (which means, in other terms, that both carbonate solvents form 75% by volume of the mixture), to which mixture is added 2% by mass of vinylene carbonate of the formula (I) defined above and comprising, as a lithium salt, $LiPF_6$ 1 M.

The results obtained with this electrolyte are illustrated by the following table.

|  | Results |
|---|---|
| Formation irreversibility | 14% |
| $R_{pulse\ 20°\ C.}$ | 9 Ω |
| $R_{pulse\ -20°\ C.}$ | 19 Ω |
| $R_{5\ s\ 20°\ C.}$ | 91 Ω |

-continued

|  | Results |
|---|---|
| Discharging −20° C. | 76% |
| Charging −20° C. C/5 | 80% |
| Charging −20° C. C/5 + CV | 100% |
| Reversibility of the charging at −20° C. | 97% |
| Reversibility test | 95% |

Considering these results, an improvement is seen in the properties of the cells, notably as regards:

the resistance properties, the instantaneous resistances at 20° C. and −20° C. and at 5 s at 20° C. being less in this example than in Comparative Example 1;

charging properties;

reversibility properties, confirming an improvement in the cycling properties and in the durability properties during the applied test and illustrated by FIG. 2.

As a summary, this example shows good properties at low temperatures for the applied cell with an electrolyte according to the invention.

Example 2

In this example, an electrolyte according to the invention is used with the aforementioned button cell, corresponding to a ternary mixture comprising two carbonate solvents PC and EMC in respective proportions of 60% by volume and 40% by volume based on the total volume of said two solvents, PC meaning propylene carbonate, EMC meaning ethyl methyl carbonate and comprising in addition to these carbonate solvents, butyronitrile corresponding at 75% by volume of said mixture (which means, in other words, that both carbonate solvents form 25% by volume of the mixture), to which mixture is added 2% by mass of vinylene carbonate of the formula (I) defined above and comprising, as a lithium salt, LiPF$_6$ 1M.

The results obtained with this electrolyte are illustrated by the following table.

|  | Results |
|---|---|
| Formation irreversibility | 14% |
| $R_{pulse\ 20°\ C.}$ | 8 Ω |
| $R_{pulse\ −20°\ C.}$ | 18 Ω |
| $R_{5\ s\ 20°\ C.}$ | 67 Ω |
| Discharging −20° C. | 76% |
| Charging −20° C. C/5 | 84% |
| Charging −20° C. C/5 + CV | 98% |
| Reversibility of charging at −20° C. | 96% |
| Reversibility test | 90% |

Considering these results, an improvement is seen in the properties of the cells, notably as regards:

resistance properties, the instantaneous resistances at 20° C. and at −20° C. and at 5 s at 20° C. being less in this example than in Comparative Example 1;

charging properties;

reversibility properties, confirming an improvement in cycling properties and in durability properties during the applied test and illustrated by FIG. 2.

Furthermore, this test demonstrates the possibility of working with significant amounts of butyronitrile and of thus benefiting from the intrinsic properties of butyronitrile, notably in terms of viscosity and of high dielectric constant.

As a summary, this example demonstrates good properties at low temperatures for the applied cell with an electrolyte according to the invention.

Example 3

In this example, an electrolyte according to the invention is used with the aforementioned button cell, corresponding to a ternary mixture comprising two carbonate solvents PC and EMC in respective proportions of 60% by volume and 40% by volume based on the total volume of said two solvents, PC meaning propylene carbonate, EMC meaning ethyl methyl carbonate and comprising in addition to these carbonate solvents, butyronitrile corresponding to 25% by volume of said mixture (which means, in other words, that both carbonate solvents form 75% by volume), to which mixture is added 2% by mass of fluoroethylene carbonate of the formula (IIa) defined above and comprising as a lithium salt, LiPF$_6$ 1M.

The results obtained with this electrolyte are illustrated by the following table.

|  | Results |
|---|---|
| Formation irreversibility | 15% |
| $R_{pulse\ 20°\ C.}$ | 8 Ω |
| $R_{pulse\ −20°\ C.}$ | 20 Ω |
| $R_{5\ s\ 20°\ C.}$ | 75 Ω |
| Discharging −20° C. | 75% |
| Charging −20° C. C/5 | 86% |
| Charging −20° C. C/5 + CV | 100% |
| Reversibility of charging at −20° C. | 98% |
| Reversibility test | 97% |

Considering these results, an improvement is seen in the properties of the cells, notably as regards:

the resistance properties, the instantaneous resistances at 20° C. and −20° C. and at 5 s at 20° C. being less in this example than in Comparative Example 1;

charging properties;

reversibility properties, confirming an improvement in the cycling properties and durability properties during the applied test and illustrated by FIG. 2.

As a summary, this example demonstrates good properties at low temperatures for the applied cell with an electrolyte according to the invention.

The invention claimed is:

1. An electrochemical cell for a lithium-ion battery comprising:
   a negative electrode comprising, as an active material, silicon;
   a positive electrode; and
   an electrolyte positioned between said negative electrode and said positive electrode, said electrolyte comprising
   (i) at least one lithium salt,
   (ii) at least one carbonate solvent, which is a mixture comprising propylene carbonate and at least one linear carbonate selected from the group consisting of diethyl carbonate and ethyl methyl carbonate,
   (iii) at least one mononitrile compound, which is a mononitrile compound comprising at least two carbon atoms outside the —CN group, and
   (iv) at least one compound having at least one of the following formulae (I) and (II):

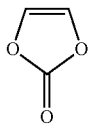

(I)

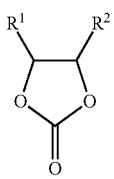

(II)

wherein R¹ and R² represent, independently of each other, H, Cl or F, provided that R¹ and R² do not both represent H,
wherein the at least one carbonate solvent is present in a content of 25-75% of a total volume of the electrolyte, the total volume excluding the at least one compound having at least one of formula (I) and formula (II), and
wherein the at least one compound having at least one of formula (I) and formula (II) is present in a content of 0.5-10% by mass, based on a total mass of the electrolyte.

2. The electrochemical cell according to claim 1, wherein the positive electrode is an electrode comprising as an active material, a material for inserting lithium of the lithiated oxide type comprising a transition metal element.

3. The electrochemical cell according to claim 2, wherein the positive electrode comprises as an active material, a material for inserting lithium of the oxide type comprising nickel, cobalt, manganese and/or aluminium.

4. The electrochemical cell according to claim 1, wherein the positive electrode comprises as an active material, a material for inserting lithium of the oxide type comprising nickel, cobalt, manganese and/or aluminium.

5. The electrochemical cell according to claim 4, wherein the oxide comprising nickel, cobalt, manganese and/or aluminium has the following formula (III):

$$LiM^2O_2 \quad (III)$$

wherein M² is an element selected from Ni, Co, Mn, Al and mixtures thereof.

6. The electrochemical cell according to claim 5, wherein the oxide comprising nickel, cobalt, manganese and/or aluminium is selected from $LiCoO_2$, $LiNiO_2$ $Li(Ni,Co,Mn)O_2$, $Li(Ni,Co,Al)O_2$, $Li(Ni,Co,Mn,Al)O_2$.

7. The electrochemical cell according to claim 4, wherein the oxide comprising nickel, cobalt, manganese and/or aluminium is selected from $LiCoO_2$, $LiNiO_2$ $Li(Ni,Co,Mn)O_2$, $Li(Ni,Co,Al)O_2$, $Li(Ni,Co,Mn,Al)O_2$.

8. The electrochemical cell according to claim 1, wherein said at least one carbonate solvent is a binary eutectic mixture comprising propylene carbonate and ethyl methyl carbonate, propylene carbonate and ethyl methyl carbonate being present in the mixture in respective contents of 60% by volume and 40% by volume based on the total volume of the mixture of carbonate solvents.

9. The electrochemical cell according to claim 1, wherein the lithium salt is selected from the group formed by $LiPF_6$, $LiClO_4$, $LiBF_4$, $LiAsF_6$, $LiCF_3SO_3$, $LiN(CF_3SO_2)_3$, $LiN(C_2F_5SO_2)$, lithium bistrifluoromethylsulfonylimide $LiN[SO_2CF_3]_2$ and mixtures thereof.

10. The electrochemical cell according to claim 1, wherein the lithium salt is $LiPF_6$.

11. The electrochemical cell according to claim 1, wherein the mononitrile compound is butyronitrile.

12. The electrochemical cell according to claim 1, wherein the mononitrile compound is present, in the composition, in a content which ranges up to 75% by volume based on the total volume of the electrolyte.

13. The electrochemical cell according to claim 1, wherein the compound having formula (II) is present and has formula (IIa):

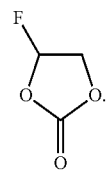

(IIa)

14. The electrochemical cell according to claim 13, wherein:
the propylene carbonate and ethyl methyl carbonate are present in the mixture in respective contents of 60% by volume and 40% by volume based on the total volume of the mixture;
the mononitrile compound is butyronitrile;
the lithium salt is $LiPF_6$;
the compound has formula (IIa);
the carbonate solvent is present in a content of 25% by volume and the butyronitrile is present a content of 75% by volume based on the total volume the carbonate solvent and the butyronitrile or the carbonate solvent is present in a content of 75% by volume and the butyronitrile is present a content of 25% by volume based on the total volume of the carbonate solvent and the butyronitrile; and
the compound of formula (IIa) is present in a content of 2% by mass based on the total mass of the electrolyte.

15. The electrochemical cell according to claim 1, wherein:
the propylene carbonate and ethyl methyl carbonate are present in the mixture in respective contents of 60% by volume and 40% by volume based on the total volume of the mixture;
the mononitrile compound is butyronitrile;
the lithium salt is $LiPF_6$;
the compound has formula (I);
the carbonate solvent is present in a content of 25% by volume and the butyronitrile is present in a content of 75% by volume based on the total volume of the carbonate solvent the butyronitrile or the carbonate solvent is present in a content of 75% by volume and the butyronitrile is present a content of 25% by volume based on the total volume of the carbonate solvent and the butyronitrile; and
the compound of formula (I) is present in a content of 2% by mass based on the total mass of the electrolyte.

16. The electrochemical cell according to claim 1, wherein at least one compound of formula (I) is present in said electrolyte.

17. The electrochemical cell according to claim 1, wherein at least one compound of formula (II) is present in said electrolyte.

18. The electrochemical cell according to claim 1, wherein at least one compound of formula (I) and at least one compound of formula (II) is present in said electrolyte.

* * * * *